United States Patent [19]

Leichum

[11] Patent Number: 5,093,826

[45] Date of Patent: Mar. 3, 1992

[54] METHOD FOR THE OPERATION OF A MULTI-PROCESSOR CENTRAL CONTROL UNIT OF A SWITCHING SYSTEM

[75] Inventor: Axel D. Leichum, Boca Raton, Fla.

[73] Assignee: Siemens Aktiengesellschaft, Berlin and Munich, Fed. Rep. of Germany

[21] Appl. No.: 415,261

[22] Filed: Sep. 19, 1989

[51] Int. Cl.$^5$ .............................................. H04Q 3/00
[52] U.S. Cl. ................................. 370/58.2; 395/800; 395/575; 364/DIG. 1
[58] Field of Search ................. 370/58.1, 58.2, 13; 364/200, 900, DIG. 1; 395/800, 575

[56] References Cited

U.S. PATENT DOCUMENTS 4,912,698  3/1990  Bitzinger et al. ................. 370/13

FOREIGN PATENT DOCUMENTS 3334796  11/1984  Fed. Rep. of Germany
2013451A  1/1979  United Kingdom

OTHER PUBLICATIONS

"Operation and Maintenance Characteristics of AKE 13" by Lars G. Ericsson et al., Ericsson Review No. 3, 1977 pp. 125-135.

"Behandlung der Datenbasis bei der Inbetriebnahme und bei Erweiterungen von EWSD-Vermittlungsstellen", A. Leichum et al., Telecom Report 9 (1986) Heft 1, pp. 22-25.

Primary Examiner—Douglas W. Olms
Assistant Examiner—Melvin Marcelo
Attorney, Agent, or Firm—Hill, Van Santen, Steadman & Simpson

[57] ABSTRACT

Method for the operation of a multi-processor central control unit of a switching system for use-friendly modification and re-structuring of information appertaining to many subscriber terminals and/or system component parts and sudden switching of the switching service to the new switching service program. A central control unit has many central processors that have access via an arbitrary half of a redundant bus system to arbitrary halves of redundant main memory sections whose halves usually store identical information. Insofar as memories are not redundant, identical information are stored in at least two different memories. In a special operating time, individual processors, one bus system half and some of the memory sections together with a memory of an address administration unit are split-off and interconnected to form an independent, special-purpose computer. In the remainder, the old switching service program continues to operate with the memory sections thereof. In the special-purpose computer, the information/programs stored therein are modified. After the reunification of the special-purpose computer with the remainder, the modified program can immediately control the switching operations in that, first only the earlier memory sections of the special-purpose computer control the switchings until the modified information are also copied into the corresponding, other memory sections.

20 Claims, 1 Drawing Sheet

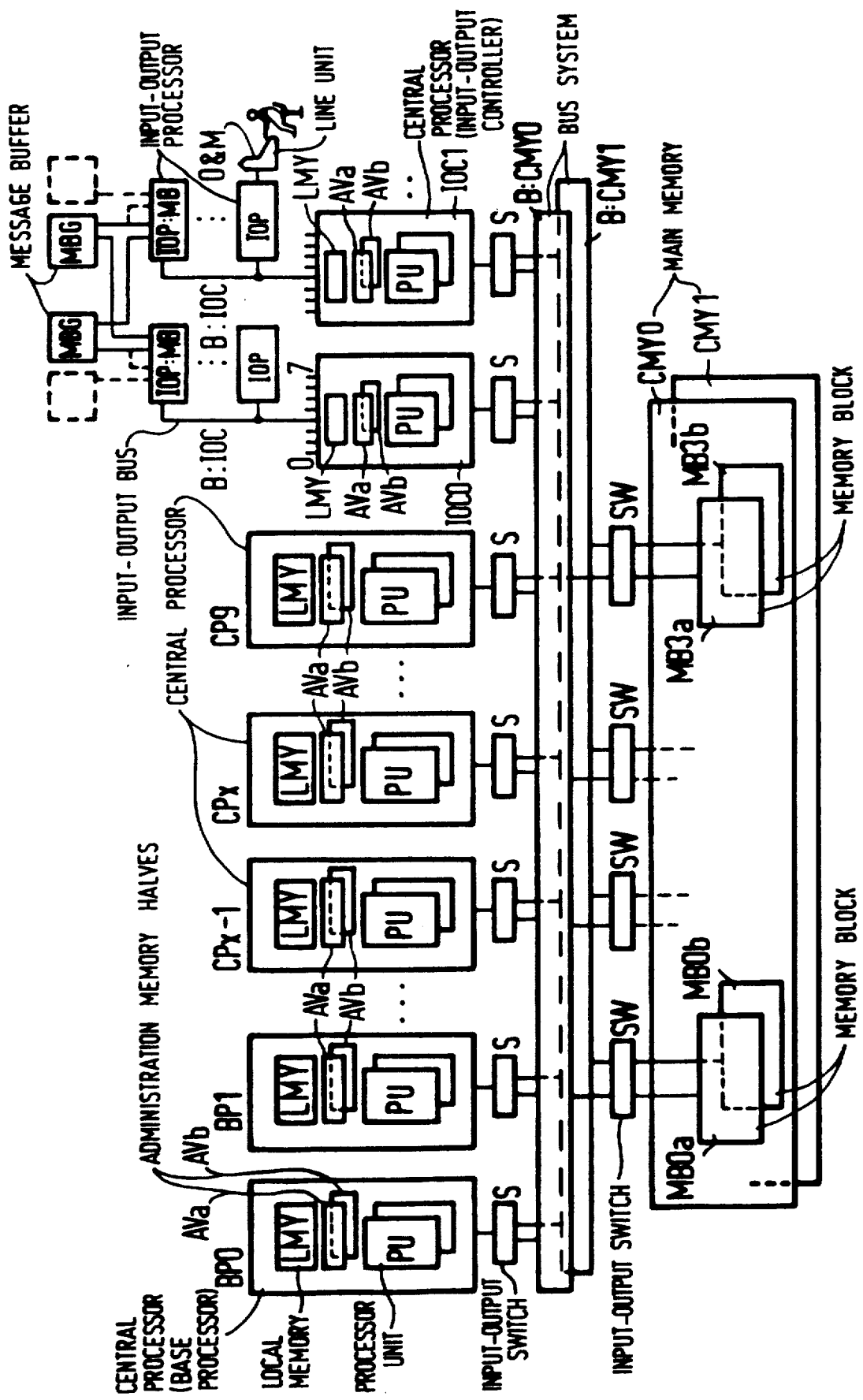

METHOD FOR THE OPERATION OF A MULTI-PROCESSOR CENTRAL CONTROL UNIT OF A SWITCHING SYSTEM

BACKGROUND OF THE INVENTION

The invention is directed to the critical problem of how a switching service program of a central control unit of a computer-controlled switching system can later be fundamentally modified without having to completely cease the handling of newly arising switching jobs for a longer time.

The invention improves the specific method recited in the preamble of patent claim 1 that is disclosed in and of itself by the publication E-A2 135 931 (U.S. Ser. No. 651,954—filed Sept. 19, 1984 now U.S. Pat. No. 4,912,698, hereby incorporated by reference.

This known method is already suitable for program modifications of a highly complex central control unit that controls an especially highly available switching system in an extremely reliable and extremely error-tolerant fashion. An extreme plurality of subscribers, for example 50,000 or 100,000 can already be connected to this known central control unit; their switching jobs are to be reliably handled, namely, disruption-free and optimally error-tolerant. It is also fundamentally suitable for simultaneous control of the many discrete switching functions of connections having different requests, for example, for simultaneous control of an extreme plurality of telephone calls, teleprinter communications, picture telephony calls, etc. The appertaining central control unit that contains many central processors contains all important component parts doubly in redundant fashion in order to enhance its reliability, whereby identical data are usually stored in redundant memories. Usually without any and all disruption of the normal switching operation, respective halves of such redundant component parts can therefore even be split off and be fundamentally interconnected to a relatively large or relatively small special-purpose computer as desired. Thus, parts of the switching service program can be reworked in the special-purpose computer during the switching service, i.e. can be cancelled, overwritten or supplemented. Given a plurality of central processors selected adequately high, for example, sixteen such processors for 50,000 subscribers, the availability of this central control unit remains extremely high. Despite splitting the special-purpose computer off and despite this reworking and program modification that may even last hours, this central control unit—as often required—is down less than, for example, one minute per year, because time-consuming initial starts can usually be avoided despite such reworkings and program modifications.

The afore-mentioned publication, however, does not yet disclose the method of the invention for also reworking the information stored in administration memory areas in order to modify the previously stored information together with the size and the start addresses of address spaces in other memory areas of the central control unit simultaneously for an extremely great plurality of subscribers and/or system component parts. Because the information in the appertaining administration memories are also modified in the invention, the other program parts of the switching system—usually a great number of other program parts—that contain virtual addresses need not be co-modified in the invention in order to achieve the reliability of this switching system given branches from the other program parts into the restructured information/program parts. The invention thus facilitates the modification of all program parts to an extraordinary degree on site directly in the central control unit without sacrificing the availability, even when these program modifications simultaneously relate to an extreme plurality of subscribers and even when modifications of extremely important program parts that are continuously intensely employed are involved.

Address administration units that serve the purpose of converting logical addresses into physical addresses (fundamentally, potentially also for converting physical addresses into logical addresses) are inherently known. German Patent Application P 36 32 608.9 (not yet published discloses such a high-performance, extremely fast address administration unit with its own, appropriately skillfully constructed memory, whereby such address administration units are quite specifically suited for the requirements of the high-performance multi-processors central control unit disclosed in the aforementioned European application. This latter German patent application, moreover, recites nothing about redundancies and EDC-monitored micro-synchronous parallel operation of the memory of such address administration units.

The as yet unpublished German Patent Application P 36 22 369.7 discloses a method for the operation of a central control unit of a switching system, whereby the central control unit contains only two processors that are normally operated in stand-by mode. As soon as a considerable fault appears, in one-half of the redundant, peripheral system components, those malfunctioning switching system components that are peripherally connected to the central control unit and are redundantly provided are split off in such emergency operation times, whereby such peripheral components that are split off respectively contain their own processors and own memories, as do the peripheral components that are not split-off. In emergency running time, one of the two central processors of the central control unit is additionally split-off, whereby this central processor that is split-off reloads the peripherally connected memories of the peripherally connected processors, and whereby—in this emergency running time—the other central processor of the central control unit together with the other, generally intact half of the peripherally connecting switching system components maintains the switching service, insofar as this is possible. As soon as the appertaining, periphery memories of the periphery processors are reloaded by the split-off, central processor, these reloaded periphery memories together with the other switching system components previously split-off assume the switching service instead of the other half of the switching system components, whereby the two processors of the central control unit are subsequently operated in stand-by mode again. This earlier German Patent Application recites nothing about the restructuring of information and quite definitely recites nothing about the restructuring of information that control the central control unit. Accordingly, nothing about the split-off of a special-purpose computer for modifying the information in an administration memory of the split-off half of a central control unit comprising redundant bus system to which many central processors and a redundant, central, main memory are connected is recited therein, either.

In the publication Telcom Report 9 (January/February, 1986), 22-26 (appeared in German on 21 March 1986) equivalent to Telcom Report 1986, No. 6, 304-309 (appeared even later in English), the inventor of the present invention himself essentially described the software aspects in considerable detail for a re-initialization of a telephone switching system digitally controlled by a fundamentally arbitrary central control unit. In this publication, he also rather extensively described software aspects for subsequent modifications of the appertaining switching surface program, partly also software aspects for the restructuring of information about the many subscribers and system components to be semi-permanently stored in the framework of this modification of the switching service program which the central control unit controls. For restructuring these semi-permanently stored information, the previous switching service program parts that are not to be modified are preferably translated out of the machine language (which corresponds to the machine language of the allocated processors and, for example, is only composed of the numerals 0 and 1 in the simplest case) into a MML command language, are then modified as needed and—apparently retranslated into the machine language—are again inserted into the overall packet of the various parts of the switching service programs. In the last paragraph before his "Schlussbetrachtung", it is summarily pointed out in this publication without recitation of hardware details that the one "half" of the central control unit in a "split" central control unit will, in future, be able to continue to control the switching service while the corresponding data block of the switching service program can be modified in the other "half" of the central control unit. This publication recites nothing about administration memories and therefore recites nothing about the advantages of the simultaneous modification of the information stored there. Nothing to the effect that—as in the invention—a split-off special-purpose computer usually does not represent "half" of the central control unit, but is far smaller than this half, i.e., for example, contains only two central processors, is recited therein, either. This publication likewise recites nothing about the normally micro-synchronous parallel operation of all redundant main component parts of a special central control unit constructed in relatively complicated fashion. Accordingly, it also recites nothing about a normally micro-synchronous parallel operation of EDC-monitored memory halves and quite definitely recites nothing about such a monitored parallel operation of the intrinsic memory areas of one or more address administration units. It likewise recites nothing about a special operation of both memory halves in the transition time after the later re-unification of a special-purpose computer and a remaining central control unit.

Certain software aspects—for modifications as well—of a switching service program are recited in extremely general fashion and with correspondingly little reference to appertaining hardware aspects in the publication, Proc. Conf. On Softw. Ing. for Telcomm., Lund, 1983, 98-103.

Authors of other companies likewise report about software aspects, including those for modifications of a switching service program, each more or less referred to specific central control unit hardware structures that are respectively established in their companies: Thus, a presentation at the Internat. Comm. Conf. in Denver 14, June 1981, printed in the publication GTE Autom. Electric J., November/December 1981, Pages 184-187 reported about software aspects, including those given modifications of the switching service program for the structure of that company's so-called GTD-5 EAX-switching system, whereby—see page 187, right-hand column, paragraph 3—the as yet unmodified data remain written in a first memory area that continues to control the previous switching service, whereas the modified data are written into a different memory area. Here, too, the modifications are executed in a higher command language. It is not set forth in detail how the hardware shift of the central control unit to the new, modified switching service program is carried out. Above all, the split-off of a redundant memory half is also not suggested herein, let alone the split-off of a redundant, normally micro-synchronously, parallely operated, inherently EDC-monitored memory half, even not in view of a memory of an address administration unit, let alone the specific fashion of how such memory halves continue to work in the transition time following a re-unification of a split-off special-purpose computer and a remaining central control unit until the normal parallel operation of the two memory halves.

Software aspects of a switching service program for the structure of the so-called AXE 10 switching system are described in the publication, Ericcson Review, 1985 No. 1, Pages 2-10, with reference to the specific central control unit established therein, namely, in view of modifications of the switching service program beginning with page 8, right-hand column. Nothing is recited therein about the utilization of the split-off possibility of a redundant memory half, i.e. likewise nothing about the split-off of normally micro-synchronously, parallely operated, EDC-monitored memory halves, let alone about a memory of an address administration unit. A specific fashion as to how one is to proceed given a re-unification of a split-off special-purpose computer and of a remaining central control unit is suggested therein, either.

The publications, AT&T Bell Lab. Rec. April 1984, pages 26-33 (for the so-called 5-ESS-Switching System), Elektr. Nachrichtenw. 59 (1985), No. 1/2, Pages 60-67 (for the so-called System 12, and commut. & transmission 1986, No. 2, Pages 5-16 (for the so-called E-10-MT-Switching System), likewise describe software aspects for modifications of switching service programs, but without clear reference to a split-off of a memory section half of redundant memories. The split-off of normally microsynchronously, parallely operated, EDC-monitored memory halves is definitely not suggested, let alone in view of a memory of an address administration unit. Likewise, the operation of the central control unit in the transition time after a re-unification of a split-off special-purpose computer and of a remaining central control unit is not described.

The publication E-A2 141 245 corresponding to U.S. Ser. No. 651,954—filed Sept. 19, 1984 now U.S. Pat. No. 4,912,698, hereby incorporated by reference discloses a method for a redundant memory that usually stores identical data in each half and that is employed in a multi-processor central control unit of a switching system. As a result of this method, the memory checks itself on the basis of a EDC code and, with a special, automatically corrects and up-dates the digits erroneously stored in one of the memory halves. The memory content of the memory half that previously stored faultily is thereby directed little by little, whereby all information in the memory half that previously stored faultily where simultaneously additional up-dated—corresponding to the new entries carried out in the "intact" memory half in the meantime. These corrections, including up-datings of the information that were implemented in the memory half that previously stored faultily, largely ensue during the operating pauses—which are respectively usually very short—wherein a normal read-write operation need not be carried out in this memory area. The corrections and up-datings, namely, ensue in that, namely completely automatically, first, the intact memory content of the intact memory half is copied stage-by-stage into the previously faultily storing memory half under identical addresses during the operating pauses of this memory half in which no normal read operation or write operation initiated by other system components is carried out;

in that, on the other hand, reading is only undertaken out of the intact memory half (this assuring error-free switching operation) during the normal read operation that is initiated by other system components—for example, subscribers—and that is implemented between those operating pauses utilized for copying, this being capable of being achieved, for example, by disconnecting the signal outputs of the faultily storing memory half during this reading; and that—in normal write operation that is initiated by other system components, for example subscribers—the data to be entered are immediately and simultaneously written into both memory halves under identical addresses (as a result whereof the up-dating of all stored data is achieved.

Only when all data in both memory halves have been made identical by copying ore the two memory halves again operated micro-synchronously, parallely EDC-monitored like normal, apart from a potential, permissible chronological slippage.

SUMMARY OF THE INVENTION

The object of the invention—to operate a highly complex central control unit that must be optimally error-tolerant and highly available such that the switching service program can be quite substantially, quickly modified simultaneously for an extremely great plurality of subscribers and/or system components without support computers, without having to completely interrupt the handling of newly occurring switching requests for a longer time, [and]with relatively little outlay—as needed, even "on site", i.e. in the building of the exchange;

whereby these modifications of the switching service program also cover complete re-structurings of information to be semi-permanently stored, i.e. of corresponding program parts and/or data; and whereby all switching service program parts—both the modified as well as the unmodified program parts—are allowed to contain virtual addresses for facilitating the program development, these not having to be co-modified as soon as an arbitrarily compartment, arbitrarily frequently required, i.e. essentially arbitrary part of the switching service program is thoroughly modified in the special-purpose computer, even the structure thereof, so that the virtual addresses that are contained in unmodified program parts as well as the virtual addresses of memory locations in which unmodified program parts are stored also need not be co-modified—is achieved by the measures recited in patent claim 1.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE is a block diagram of a multi-processor central control unit of a switching system.

DESCRIPTION OF THE PREFERRED EMBODIMENT

The invention and further developments thereof shall be set forth in greater detail with reference to the exemplary embodiment shown in the FIG. This exemplary embodiment is largely constructed and operated in conformity with the afore-mentioned publication E-A2 135 931, so that not all details of this exemplary embodiment need be discussed in great detail here. The FIG. thus shows a highly error-tolerant, highly available multi-processor central control unit of a digitally controlled switching system in terms of those component parts most critical for the explanation of the invention. Most of the critical component parts are doubly provided in redundant fashion, are each individually EDC-monitored, and, apart from a slight, permissible slippage, are normally micro-synchronously parallely operated. Given malfunctions, the intact half of the redundant component parts can respectively assume the switching service by itself. All transfers from one component part to another component part of this central control unit—in fact, even nearly all transfers between the various components parts of the entire switching system—are likewise EDC-monitored with a plurality of EDC chips for enhancing the reliability of the switching system.

For enhancing the calculating speed, the central control unit contains a plurality of central processors BP, CP and IOC that, for example, are operated to the afore-mentioned publication E-A2 135 931. For enhancing the availability and reliability, these central processors are respectively redundant in and of themselves. Namely, they at least contain the processor units PU that, apart from a slight, permissible slippage, are micro-synchronously, parallely operated and each EDC-monitored in and of themselves which, for example, can be constructed and operated according to the publication E-A2 140 155 corresponding to U.S. Ser. No. 651,954—filed Sept. 19, 1984, now U.S. Pat. No. 4,912,698,hereby incorporated by reference.

For enhancing the calculating speed and reliability, these central processors in the illustrated example each respectively contain a separate, local memory LMY that, for example,, are operated according to the publication E-A2 141 984 corresponding to U.S. Ser. No. 651,954—filed Sept. 19, 1984, now U.S. Pat. No. 4,912,698, hereby incorporated by reference. These local memories LMY then each particularly store those program parts that the appertaining processor BP, CP, IOC needs frequently and/or especially quickly without having to first access the main memory CMY via the bus system B:CMY; the various local memories LMY of these processors thus contain at least largely identical parts of the switching service program. For enhancing the availability and reliability, these local memories LMY can fundamentally likewise be redundant and EDC monitored in and of themselves according to the afore-mentioned publication E-A2 141 245 and, apart from a slight, permissible slippage, can be operated micro-synchronously, parallely in and of themselves.

These central processors BP, CP, IOC are connected via switches S- or, respectively, via IO units S - to the bus system B:CMY that, for enhancing the availability and reliability, is likewise redundant in and of itself and EDC-monitored and is also micro-synchronously, parallely operated except for a slight, permissible slippage This bus system B:CMY is also connected to the central main memory CMY via its own switches SW or, respectively, via IO units SW.

For reducing its access times and for enhancing its memory capacity, reliability and availability, this main memory CMY contains a plurality of memory blocks MB each having their own memory controllers. These memory blocks MB are likewise each redundant in and of themselves and EDC-monitored and, apart from a slight, permissible slippage, are also normally micro-synchronously, parallely operated.

Only in special instances, for example, given malfunctions or during special operating times, one of the halves of the EDC-monitored, redundant component parts of the central control unit is entirely disconnected or split-off, whereby the other half maintains the switching service alone.

In the illustrated example, at least the processors BP, CP, IOC each respectively contain an address administration unit individually allocated to them, each of which respectively contains its own administration memory AV. These administration memories AV can also be redundant, be intrinsically EDC-monitored and be operated parallel like the other memories LMY, CMY. These address administration units individually allocated to all central processors BP, CP, IOC allow virtual addresses to be employed in all switching service program parts handled by these processors, this facilitating the production and servicing of all of these program parts—and they allow long waiting lines given access of a central processor onto such an administration memory AV to be avoided.

During operating times, both halves of the redundant memories, for example, MB-AV and LMY as well in case these are redundant—store usually identical information under identical addresses in error-monitored fashion, whereby all stored information recognized as faulty are generally corrected by successive reading from the other, intact memory half and copying the read, intact information into the faulty memory half, for example, in an especially dexterous fashion according to the afore-mentioned publication E-A2 141 245.

The illustrated example of the invention thus utilizes redundant memory sections wherein—during normal operating times—the intact, other memory section half-—and, thus, the information stored in the intact memory section half—assumes the switching service alone as soon as the error monitoring has identified a faulty storing in the one memory section half, assuming this until all stored information (partially or completely faulty) in the faultily storing memory section half are corrected—potentially up-dated as well—by automatic copying from the intact memory section half.

In an example of the invention, the memory sections allocated to the special-purpose computer respectively contain one-half of an entire such memory block or of a plurality of such inherently redundant memory blocks and/or LMY and/or AV or also respectively only contain sections thereof, perhaps even only extremely small sections. At the very least, however, the memory section allocated to the special-purpose computer always contains one or more administration memories AV regardless of whether these administration memories AV are respectively redundant or not in the appertaining central control unit and regardless of whether the entire central control unit contains many or only a few administration memories AV, i.e. also regardless of whether every processor individually contains its own administration memory AV. In case all administration memories AV of an embodiment of the invention are likewise intrinsically redundant and DEC-monitored and are also normally micro-synchronously, parallely operated except for a permissible slippage, the memory sections of the special-purpose computer in the invention contain at least a single, split-off half of such an administration memory AV. The halves of such redundant administration memories AV are respectively referenced AVa and AVb in the FIG. When such redundant administration memories AVa/AVb are split during the special operating time, the respectively one-half is allocated to the special-purpose computer and the otter half is allocated to the remaining central control unit.

These administration memory halves AVa and AVb are thus also preferably each intrinsically EDC-monitored and, apart from a slight, permissible slippage, are normally micro-synchronously operated according to the afore-mentioned publication EA-141 245, whereby these memories also automatically correct information stored in them in emergencies. In such administration memory halves AVa, AVb, too, the automatic correction procedure already present can again subsequently, automatically make information initially deviating from one another identical to one another again after the re-unification of the special-purpose computer and of the remaining central control unit, in that the information of the one-half, for example, AVa, are automatically copied into the other half, AVb in this case. This automatic procedure thus assures that identical information are always stored under identical addresses in the two, reunited memory halves after a short time. In the same fashion, non-identical information in other redundant memories, for example, in MB3, can automatically made identical to one another after the reunification.

A plurality of component parts of the switching system are peripherally connected to this central control unit, thus, for example, a plurality of input-output processors IOP via a plurality of input-output busses B:IOC—for example, peripherally disposed message buffers MBG are also connected to many of these input-output processors, for example IOP:MB, to which message buffers MBG peripherally disposed switching system components (no longer shown in the FIG.) are connected, for example, switching matrix network sections having their own macro group of subscriber terminals.

For the formation of the special-purpose computer, some of the component parts of the illustrated central control unit are split off in the special operating times, including one-half of the redundant bus system B:CMY, as well as a part of the memories CMY, LMY, AV—in case these memories are respectively redundant, but generally only a split-off half of such redundant memories. For example, thus, the special-purpose computer can respectively contain the entire administration memory AV of a plurality of address administration units or, respectively, of a plurality of the processors BP, CP, IOC, together with, for example, one-half CMY 1 of the main memory CMY or, for example, only the half MB3*b* of the memory block MB3, perhaps also together with one or more of the local memories LMY of one or more of the central processor BP, CP and/or IOC of the central control unit or, as well, only halves of such local memories LMY. In normal operating times and in transition times, i.e. before the split-off and after the re-unification, split-off memory section halves of redundant memory sections are thereby preferably operated according to the initially cited publication E-A2 135 931.

In case a memory section is not redundant and normally operated parallel in EDC-monitored fashion, at least two different memories are generally present in the central control unit, these storing identical information, whereby the content of the one memory can also be copied into the appertaining, other memory if necessary. All important information are thus stored at least twice In special operating times, thus, memory sections together with one or more of the central processors BP, CP, IOC—including at least one base processor BP—and together with one bus system half are interconnected to form the independently operable special-purpose computer. The other component parts of the central control unit, i.e. the remaining central control unit, continues to control the switching service according to the previous switching service programs For example, thus, the special-purpose computer contains the component parts IOC1 and BP1—that, for the sake of dependability, are each respectively individually EDC-monitored—together with their LMY and AV, further containing B:CMY1 and CMY1, potentially also a few of the CMP. The memory sections contained in the special-purpose computer can be all—or can at least be part—halves of redundant memory sections, i.e., for example, halves of redundant administration memories AV, halves of redundant local memories LMY and halves of redundant memory blocks MB of the main memory CMY. In its memory sections, the special-purpose computer then always contains all of the most important switching service program parts of the entire central control unit. In the invention, however, a part of the memory sections of the special-purpose computer can be formed by complete local memories LMY, AV as well, of the central processors, particularly when the appertaining processor is completely added to the special-purpose computer anyway. Since the local memories, see LMY, of the various processors BP, CP, IOC already contain largely or completely identical switching program parts, the special-purpose computer memory in this configuration also, as frequently desired, largely or completely contains the most important switching program parts of the entire central control unit in its various memory sections, so that arbitrary parts of all important program parts can be modified in the special-purpose computer. Simultaneously, however, the remaining central control unit likewise contains all important program parts, so that the remaining central control unit can fully maintain the switching service by itself, namely, according to the previous, unmodified program parts, even though the special-purpose computer has been split-off.

This inventively operated special-purpose computer can also have other component parts allocated to it, for example, the operation-and-maintenance station O&M shown in the FIG. together with an allocated input-output processor IOP.

What is utilized in the illustrated invention is that each of the central processors BP, CP, IOC has optional access onto any arbitrary half of the two halves of the bus system B:CMY and onto any arbitrary half of the two halves of each and every memory block MB—for example, with the arbitrarily actuatable switches S and SW or with input-output units (IO units) S and SW servicing as such switches. A modification of the part of the switching service program previously stored therein is thus later input into this special-purpose computer. As a result of this split-off of the special-purpose computer triggerable on site, even immediately in the office building, no additional support computer is now required for the modification of the appertaining data, this considerably facilitating operation.

During the special operating time, the remaining central control units therefore generally contains all other memory sections, processors, etc. that have not been split off. For example, it thus contains the central processors BPO, CPO . . . CP9, IOC0 (IOC2 . . . ), the bus system half B:MCY0 and the half CMY1 of the main memory CMY together with the administration memories AV and local memories LMY of those processors BP0, CP0 . . . CP9, IOC0 . . . .

At the end of the special operating time, at least some of the essential component parts of the special-purpose computer—including its memory sections which contain the modified information in the meantime—are reunited with the remaining central control unit, whereupon the reunited, generally now complete central control unit is immediately controlled either by the previous, unmodified switching service program or by the modified switching service program, initiated by corresponding continued operation instructions input, for example, via the O&M station. A transition time now follows, after the end whereof, finally, identical information—i.e., switching service programs that are again uniformly unmodified and where already previously input or that are now modified—are stored both in the earlier memory sections of the special-purpose computer as well as in the earlier memory sections of the remaining central control unit as a consequence of corresponding copying measures.

During the switching operation, on site and without support computers, the invention thus enables an extremely low-outlay, fast production of the modified information despite the complete restructuring of the semi-permanently stored information connected therewith, even when these information respectively affect a great number of the subscriber terminals, for example, hundreds or thousands simultaneously, and/or affect a similarly great plurality of switching system components. The invention also enables an immediate switching of the central control unit to the modified programs—especially because information semi-permanently stored in the administration memory AVa/Avb are also at least partially modified in the invention. The outlay for such restructuring is relatively low because nearly all important program parts can continue to retain the virtual addresses that they contained earlier—they thus need not be co-modified, even if the physical memory capacities are very substantially changed and the information in extremely large memory sections, for example in the entire main memory CMY and in the local memories LMY, are quite substantially restructured. The invention is therefore particularly suited for operating instances wherein the switching service programs are to be modified because the plurality of subscribers connected to the message buffer MBG, the plurality of central processors BP, CP and/or IOC and/or the capacities of its memories CMY, LMY and/or AVa/Avb thus extremely increased or diminished and/or because additional facilities and/or other equipment—for example, the possibility of picture telephony and of other picture transmissions—are to be immediately offered to all connected subscribers. Particularly, when the sudden shift from the old switching service to the new, modified switching service is carried out in a time having little switching service, i.e., for example, in certain night hours, the handling of newly arising switching requests, switching service, is advantageously thereby hardly deteriorated despite the plurality of affected subscriber/system components/memory capacity/memory locations/frequency bandwidths, even when the entire switching operation is suddenly shifted from the previous information, i.e. from the previous, arbitrary program, to the new, modified information, i.e., to the new, modified, arbitrary program. The actual switching of the central control unit to the modified program, namely, also inherently requires only, for example, the duration of a single or of only a very few machine clocks of the central control unit as soon as the modified information are input, whereby the central control unit handles the switching service completely according to the earlier, unmodified or according to the new modified switching program immediately after the switch-over i.e. long before the end of the transition time—i.e. without a longer-lasting, complete interruption of the switching service being required. The switch-over is thus so rapid that the availability of the switching system is only slightly disturbed during the switch-over.

The illustrated embodiment of the method of the invention, moreover, is also quite especially service-friendly, i.e. very comfortable to manipulate, because the new, modified program parts from the earlier memory sections of the special-purpose computer can also be automatically copied into the earlier memory sections of the remaining central control unit very quickly and without disturbing the switching operations after the re-unification of the special-purpose computer with the remaining central control unit.

The relatively problem-free re-structuring of the semi-permanently stored information in the invention can thus also cover a very pronounced modification of the structure of the physical addresses of switching service data that are to be written in, namely, simultaneously for many subscribers/system components. For example, it can thus also co-cover a designational diminution or enlargement of physical address spaces and/or a complete re-addressing thereof.

The restructuring is even more greatly facilitated when at least one part of the, for example, semi-permanently stored information in the memory sections, for example, MB3*b*/AVb, in the split-off special-purpose computer are first translated in very user-friendly fashion into a higher language—for example, into a higher MML command language and/or into a higher programming language such as CHILL and/or into a flow chart and/or into a colloquial language—by a first language translation unit and are output—for example, printed out, registered and/or displayed—at the O&M station O&M. For example, this first language translation unit is accommodated in the central main memory CMY or in the O&M station. Subsequently, the modified information to be stored, for example, to be semi-permanently stored in the appertaining memory section MB3*b*/AVb for a later, modified switching service are input via the O&M station O&M of the special-purpose computer thereinto or in some other, higher language being input, for example, directly via keyboard or in edited fashion with a magnetic tape; more specifically: with a magnetic tape recorder attached at the O&M station. These modified information are continuously translated into the machine language either immediately or later with the first or with a second language translation unit and are stored in the memory sections MB3*b*/AVb of the special-purpose computer. For example, this second language translation unit can likewise be accommodated in the O&M station or in the central main memory CMY.

The reunification that is initiated by an appropriate continued operation instruction input, for example, via the O&M station O&M is achieved suddenly, for example, during the duration of a single machine clock of the central control unit, with, for example, those input-output units S and SW. Dependent upon which continued operation instruction is input via the O&M station, moreover, only the appropriate memory sections but not the "wrong" memory sections are activated beginning with the reunification, as a result whereof all switching requests now arising are immediately handled either according to the earlier, unmodified or according to the new, modified switching program as desired—i.e. dependent on the type of input continued operation instructions. Immediately after the re-unification, accordingly, the central control unit—and, thus, the entire switching service—initially continues to be controlled, as desired, either only with the earlier memory sections of the special-purpose computer, i.e. with the modified information of the switching service program stored there, or only with the earlier memory sections of the remaining central control unit, i.e. with the earlier, unmodified information. This can be achieved in that the normal read-write operation between these appertaining memory sections and the processors and other system components are temporarily controlled in a special fashion: for example, in that the signal outputs of the "wrong" memory sections that are not yet intended to continue to control the central control unit at this moment are temporarily deactivated at least during the read events until the information—preferably on the basis of automatic copying—in the earlier memory sections of the special-purpose computer are identical to the information in the corresponding, other, earlier memory sections of the remaining central control unit.

In the illustrated example, thus, the appertaining, "wrong", earlier memory sections are preferably to be temporarily operated preferably such as though their EDC circuit had identified errors, i.e., invalid information in them. Preferably, namely, an automatic copying of all corresponding, intact information from the active, intact memory section into the other, earlier memory section that had hitherto stored "wrong" information is initiated—whereby, initially only the "correct", intact memory section initially assumes the switching service by itself for the control of the switching service up to the conclusion of this copying. In this case—preferably in one or more short operating pauses of the respectively appertaining component parts wherein the central control unit thus does not require the appertaining memory sections for the control of the switching service—the information stored in the intact memory section half are successively read with an automatic forwarding address generator and are immediately automatically copied into the other, "wrong" memory section under the respectively same address until the memory contents of both memory sections are identical. Subsequently, these two memory sections are again operated in common as in normal operating times.

In the invention, a part of the information can also be modified such that they correspond to a newly offered sub-program that controls a facility and, fundamentally can be arbitrarily long. Especially little memory requirement despite especially little surfacing outlay can thereby be achieved when a part of the modified information are input such that they respectively correspond to beginning addresses of sub-programs that are likewise input and control the facilities. On the basis of an individual allocation of subscriber terminals connected, for example, to the units MBG to such beginning addresses, individual subscribers can have access to these newly established facilities respectively individually enabled.

A few examples of the most important measures and the advantages respectively obtainable as a result thereof shall be summarized below in as precise and detailed fashion as possible with reference to the FIG.:

The invention involves a method for the operation of a multi-processor central control unit of a switching system. The central control unit contains at least a plurality of central processors BP, CP, IOC, a bus system B:CMY and a central main memory CMY. The processors BP, CP, IOC that automatically handle switching requests from subscribers, for example, subscribers connected via MBG, on the basis of local memories LMY, AV individually allocated to them are connected parallel to the bus system B:CMY, as they are to the main memory CMY comprising blocks MB that cooperates with the processors BP, CP, IOC. Above all, the local memories LMY, AV respectively store those program parts that the appertaining processor BP, CP, IOC requires especially frequently and, particularly in emergencies, especially quickly and that it can immediately access without having to occupy the bus system B:CMY and the main memory CMY. At least one of the processors, referred to as base processor, for example, BP0 and BP1, also serves the purpose of splitting off and reuniting component parts of the central control unit, to which end, for example, it uses switches or, respectively, input-output units S, SW. At least one section MB of memories, and, namely, at least one section of the main memory CMY, as well as the bus system B:CMY are doubled in redundant fashion, so that the processors BP, CP, IOC have access via each bus system half B:CMY0, B:CMY1 two halves MB0a, MB1a, MB2a, MB3a, MB0b, MB1b, MB2b, MB3b of such redundant main memory sections MB, CMY. In normal operating times, the redundant memory sections MB, CMY store identical information in a machine language adapted to the processors BP, CP, IOC—namely, data and/or program parts that relate to component parts and/or functions of the switching system and/or connections. In a special operating time, preferably in times having especially little switching service, component parts, for example, BP1, IOC1, B:CMY1, MB3b, of the central control unit are split off by at least one base processor, for example, BP1, and are interconnected to a special-purpose computer. This special-purpose computer contains at least one of the processors, including at least one base processor, for example, BP1, as well as a bus system half, for example, B:CMY1, and a plurality of memory sections—including the local memories LMY, AV of the processors BP1, IOC1 belonging to the special-purpose computer—, as well as at least one split-off half MB3b of redundant main memory sections MB, if not even a half CMY1 of the entire main memory CMY. The switching requests that arose before the special operating time as well as the switching requests newly arising during the special operating time continue to be handled in the remaining central control unit according to the previous switching service program, i.e. in the remaining processors, for example, BP0, CP0 . . . CP9, IOC0 . . . with their local memories LMY, AV, in the other bus system half B:CMY0 and in those memory sections CMY0 that are not split-off. Both the memory sections, for example CMY1, of the special-purpose computer as well as the memory sections of the remaining central control unit additionally each contain at least one administration memory AV of an address administration unit, whereby the administration memory AV respectively serves at least one of the processors for converting virtual addresses into physical addresses. During the special operating time, modified information, i.e. modified data and/or modified parts of the switching service program, are input into memory sections of the special-purpose computer via a line unit 0&M. The switching service program is thereby modified at least by re-ordering of information to address spaces and/or by re-structuring of information to be semi-permanently stored in these address spaces, whereby all these information can also relate to a great plurality of subscriber terminals, for example, subscriber terminals connected to MPG, and/or to a great plurality of switching system components, for example, MBG, IOP. A part of the modified information are input via the line unit 0&M not only into sections of the main memory (for example, into MB3b) but also at least into sections of the administration memories AV of the special-purpose computer. At the end of the special operating time, at least significant component parts of the special-purpose computer are again reunited suddenly with the remaining central control unit, whereby all memory sections CMY, LMY, AV again operate fully effective as in normal operating times no later than after a transition time that follows the reunification. The measures combined up to now allow the highly complex central control unit that must be optimally error-tolerant and highly available to be operated such that the switching service program can be quite substantially modified simultaneously for an extremely great plurality of subscribers and/or system component parts with relatively little outlay without interrupting the normal switching service—as needed, even "on site", i.e. in the building of the switching center, and without support computers. These measures, further, allow that these modifications of the switching service program also cover complete restructurings of information to be semi-permanently stored, i.e. of corresponding program parts and/or data. Above all else, these measures also allow that all switching service program parts—both the modified ones as well as the unmodified ones—are allowed to contain virtual addresses that need not be co-modified as soon as an arbitrarily important part of the switching service program that is required arbitrarily often, i.e. an inherently arbitrary part of the switching service program is fundamentally modified in the special-purpose computer; the virtual addresses that are specified in unmodified program parts as well as the virtual addresses of memory locations in which unmodified program parts are stored thereby need not be co-modified.

In an improvement of the invention, the central control unit does not continue to be controlled by the modified switching service program after the reunification, but by the earlier, unmodified switching service program. After the storing of the modified information in memory sections CMY1, AV of the special-purpose computer, the function ability of the modified information is first tested within the special-purpose computer. After this, the tested—potentially additionally re-worked—modified information are intermediately stored in a background memory—for example, attached in the O&M—i.e., for example, on a magnetic tape before the special-purpose computer is reunited with the remaining central control unit. Initiated by a corresponding continued operation instruction, the switching requests in the transition time first continue to be handled by the earlier memory sections CMY0, AV of the remaining central control unit until the earlier memory sections of the special-purpose computer have been automatically overwritten—in operating pauses of the corresponding, earlier memory sections of the remaining central control unit—with the information that are stored in these earlier memory sections of the memory central control unit, so that the modified information entered into the memory sections of the special-purpose computer before the reunification are erased or overwritten. As a result of this development, a tested, modified part of the switching service program can be produced on hand by the split-off special-purpose computer in order to be able immediately modify the switching operation therewith later—for example, as soon as the capacities of the main memory are adequately enlarged in terms of hardware—or in order to enter the tested, modified switching service program into some other, similarly constructed central control unit of some other switching exchange later that, for example, is situated at a distance of thousands of kilometers.

In another development of the invention, by contrast, the newly arising switching requests are handled according to the modified switching service program after the reunification. Initiated by a corresponding continued operation instruction, the newly arising switching requests in the transition time are first handled for this purpose only by processors, for example BP1, IOC1, that have immediate access to administration memories AV containing modified information, so that these processors BP1, IOC1 can also immediately identify the physical addresses of those information that were most recently stored in the main memory section CMY1 of the special-purpose computer. These processors BP1, IOC1 that are capable of immediate access are initially not yet co-controlled in the transition time by the earlier memory sections CMY0, AV of the remaining central control unit—for example, by temporary deactivation of the signal outputs of all memory sections, see CMY0, LMY, AV, that do not yet store modified information, namely, at least during reading. Subsequently, the modified information stored in the earlier memory sections CMY1 or, respectively, LMY, AV of the special-purpose computer are automatically overwritten with those information that are stored in these earlier memory sections CMY0, LMY, AV of the remaining central control unit—being overwritten therewith in operating pauses of the corresponding, earlier memory sections CMY0, LMY, AV of the remaining central control unit. As a result of this development, the switching operations can be shifted to the new, modified switching service program very quickly and without disturbing the availability—especially easily during times having relatively little switching service, i.e., for example, at night—, i.e., for example, during a single or during a few machine clocks that control the central control unit. In the following transition time, the memory contents of the reunited memory halves are made identical to one another quickly and without deteriorating the switching service and their normal parallel operation is again quickly enabled.

In a next development of the invention, a separate administration memory AV is respectively individually allocated to all processors BP, CP, IOC. All administration memories AV of the special-purpose computer are already written with all modified information that they are intended to store later after the reunification, being written therewith in the special operating time. In the transition time, only the processors previously contained in the special-purpose computer, for example, BP1, IOC1, initially carry out the switching service with the assistance of their administration memories AV. In the transition time, namely, the administration memories AV of the remaining processors, see BP0, CP0 . . . CP9, IOC0 . . . , are first written with the modified information intended for them, before these remaining processors also again assumes switching requests with full effectiveness as a result of this development, a very fast shift of the central control unit from the old service program to the modified switching program can be achieved without jeopardizing the availability of the switching system in a multi-processor central control unit that should always be highly available and wherein, therefore, long waiting lines should be avoided insofar as possible when accessing administration memories—namely, even in times having relatively heavy switching operations, when, initially, some of the otherwise central processors were allocated to the special-service computer and when—before the reunification—all local memories of the processors belonging to the special-purpose computer, including all of its administration memory sections, were written with the modified information intended for them.

In a development thereof, at least many of the processors BP, CP, IOC contain their own local memories LMY which store program parts—identical from processor to processor—for the implementation of their switching requests. In the transition time, the processors not previously contained in the special-purpose computer, see BP0, CP0 . . . CP9, IOC0 . . . , immediately receive a stimulus—for example, from the base processor BP1 previously contained in the special-purpose computer—to write modified information into the administration memory AV individually allocated to them on the basis of a program parts stored in their respectively own local memory LMY. As a result of this additional development, the local administration memories of all processors that did not previously belong to the special-purpose computer can additionally be automatically loaded in the reunification with the modified information intended for them and can thus be updated, so that all processors are again fully available for the switching service shortly thereafter.

In a development of the invention, a separate, redundant administration memory AVa, AVb is additionally individually allocated to every processor BP, CP, IOC. The special-purpose computer additionally respectively contains one-half of all administration memories AVb of all processors BP, CP, IOC in its memory sections CMY1, LMY, AVb. Before the reunification, all administration memory halves AVb contained in the special-purpose computer, but not the other halves AVa of these administration memories AV are loaded with the modified information intended for them. In the transition time—in operating pauses of the appertaining administration memories AVa, AVb—the information that are stored in the first administration memory half AVa—or AVb—and that control the switching surface since reunification are also automatically written into the second administration memory half AVb—or AVa—before both administration memory halves AVa, AVb of every processor BP, CP, IOC again operate with full efficiency as in normal operating times. As an additional development thereof, every processor BP, CP, IOC can also have its own redundant local memory LMY allocated to it that is written with the switching program parts that are frequently required and are immediately required in emergencies. The special-purpose computer additionally respectively contains the one-half of all local memories LMY of all processors BP, CP, IOC. Before the reunification, all halves of these local memories LMY contained in the special-purpose computer, but not the other halves of these local memories LMY are loaded with the modified information intended for them. In the transition time—in operating pauses of the appertaining halves—the information that are stored in the first half of the local memories LMY and that control the switching service since the reunification are also automatically copied into the respectively corresponding, second-half of these local memories LMY before these two halves of the local memories LMY of the processors BP, CP, IOC again operate in parallel with full efficiency as in normal operating times. These latter two developments allow an especially fast resetting of the central control unit optionally to the earlier or to the modified switching service despite high availability even in times having extremely heavy switching operations—even when the ultimate decision as to whether the earlier or the modified switching service program is to take affect after the reunification is not made until shortly before the reunification.

In a development of the invention, at least a part of the modified information input into the administration memory AV modifies the size of the address space defined by physical addresses. This allows more facilities and/or special service equipment than hitherto or fewer facilities/special service equipment then hitherto and/or considerably modified capacities of the main memory as a result of corresponding enlargement or reduction in size of the main memory to be made immediately available, namely, even for a great plurality of subscribers, even when such considerable modifications were not originally planned.

In a development of the invention, at least one part of the modified information corresponds to a facility newly established for subscribers. In addition thereto, at least one part of the modified information can correspond to the beginning addresses of sub-programs that control the facility. These developments respectively allow even longer sub-programs for newly offered facilities to be entered into the central control unit in an extremely simple way.

In another development of the invention, the line unit O&M of the special-purpose computer contains an external data carrier that carries magnetically recorded, modified information. The modified information are written from this data carrier into memory sections CMYl, LMY, AV of the special-purpose computer. As a result thereof, edited modified information can be quickly input into the split-off special-purpose computer.

In a development of the invention, the line unit O&M represents a redundant user station O&M. The modified information are input into the special-purpose computer via a split-off half of the user station O&M. In special operating times, these measures allow a normal operation and waiting service of the remaining center control unit to be simultaneously implemented in addition to the work at the special-purpose computer.

Still preceding the split-off of the special computer or only after the split-off of the special computer, but still before the reunification, at least one part of the information that are semi-permanently stored in the administration memory AV of the special-purpose computer and/or in other memory sections CMYl, LMY of the special-purpose computer in a development of the invention are translated into a higher language by a first language translation unit—for example, attached in PMY or in O&M—, for example, into a command language such as MML and/or into a higher programming language such as CILL and/or into a colloquial language. This translation is output at the line unit O&M of the special-purpose computer, for example, is displayed or printed out or recorded on a data carrier. In the special operating time, the modified information are entered into the special-purpose computer in the same or in some other higher language via the line unit O&M and are translated into the machine language in the first or in a second language translation unit—for example, attached in CMY—and are stored in the respectively appertaining memory sections CMYl, LMY, AVb of the special-purpose computer. These measures of this development allow the intellectual efforts when working at the special-purpose computer to be considerably reduced.

In a next development of the invention, the special-purpose computer also contains memory sections of the halves of switching system components—doubly, peripherally connected to the central control unit in redundant fashion—that contains their own, i.e. decentralized memory sections and their own, i.e. decentralized processors. In addition to the operation of the central processors of the central control unit, this development now also allows the operation of the decentralized processors that are attached in periphery system components—i.e., in parts of the switching matrix network—to be modified without interrupting the on-going switching operations.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Method for the operation of a multi-processor central control unit of a switching system,
   whereby the central control unit at least contains a plurality of central processors, a bus system and a central main memory,
   whereby the processors that independently handle switching requests from subscribers with local memories individually allocated to them, as well as the main memory having blocks collaborating with the processors are connected parallel to the bus system, whereby the local memories particularly respectively store those program parts that the appertaining processor calls in particularly often and, especially in emergencies, particularly quickly without having to access the main memory via the bus system, whereby at least one of the processors, referred to as base processor, also serves for splitting off and for reuniting component parts of the central control unit, whereby at least one section of memories, and, namely, at least of the main memory, as well as the bus system are doubled in redundant fashion, so that the processors have access via each bus system half to halves of such redundant main memory sections, whereby—in normal operating times—the redundant memory sections store identical information in a machine language adapted to the processors—namely, data and/or program parts that relate to component parts and/or functions of the switching system and/or connections, whereby—in a special operating time, preferably in times having especially little switching service—component parts of the central control unit are split off by at least one of the base processors and are interconnected to form a special-purpose computer that contains at least one of the processors, including at least one base processor, as well as a bus system half and a plurality of memory sections, including the local memories of the processors belonging to a special-purpose computer, as well as at least one split-off half of redundant main memory sections, whereby the switching requests that arose before the special operating time as well as the switching requests newly arising during the special operating time are continued to be handled in the remaining central control unit according to the previous switching service program, i.e. in the remaining processors, in the other bus system half and in the memory sections that have not been split off, whereby—in the special operating time—modified information, i.e. modified data and/or modified parts of the switching service program, are input via a line unit into memory sections of the special-purpose computer, whereby at least significant component parts of the special-purpose computer are reunited with the remaining central control unit at the end of the special operating time, and whereby all memory sections again operate with full efficiency as in normal operating times, operating thusly no later than after a transition time following the reunification, comprising, in the special operating time, both the memory sections of the special computer as well as the memory sections of the remaining central control unit respectively co-contain at least one administration memory of an address administration unit, whereby the administration memory of at least respectively one of the processors serves for the conversion of virtual addresses into physical addresses;

and the switching service program is modified at least by re-ordering information to be semi-permanently stored to address spaces as well as by re-structuring information to be semi-permanently stored in these address spaces, these relating to a great plurality of subscriber terminals and/or to a great plurality of switching system component parts, a part of the modified information being also input via the line unit into sections of at least one of the administration memories that are allocated to the special-purpose computer.

2. Method according to claim 1, wherein after the storing of the modified information in memory sections of the special-purpose computer, the functionability of the modified information is first tested within the special-purpose computer; wherein subsequently, the tested and potentially additionally reworked modified information are intermediately stored in a background memory, before the special-purpose computer is reunited with the remaining central control unit; wherein in the transition time initiated by a corresponding continued operation instruction, the switching requests initially continue to be handled with the earlier memory sections of the remaining central control unit until the earlier memory sections of the special-purpose computer have been automatically overwritten with the information that are stored in these earlier memory sections of the remaining central control unit—being thusly overwritten in operating pauses of the corresponding, earlier memory sections of the remaining central control unit—so that the modified information written into the memory sections of the special-purpose computer are erased or overwritten before the reunification.

3. Method according to claim 1, wherein after the unification, the newly arising switching requests are handled according to the modified switching service program, wherein initiated by a corresponding continued operation instruction, the newly arising switching requests in the transition time are initially handled only by those processors that have immediate access to administration memories that contain modified information, so that these processors can also immediately identify the physical addresses of those information that were most recently stored in the main memory section of the special-purpose computer, wherein these processors capable of immediate access in the transition time are initially not yet co-controlled by the earlier memory sections of the remaining central control unit and wherein subsequently, the modified information stored in the earlier memory sections of the special-purpose computer are automatically overwritten with the information that are stored in thee earlier memory sections of the remaining central control unit, being automatically overwritten therewith in operating pauses of the corresponding, earlier memory sections of the remaining central control unit.

4. Method according to claim 3, wherein all processors respectively have their own administration memory individually allocated to them; wherein all administration memories of the special-purpose computer are already written in the special-operating time with all modified information that they are intended to store later after the reunification; wherein, in the transition time, only the processors previously contained in the special-purpose computer initially implement the switching operation with the assistance of their administration memories; and wherein in the transition time, the administration memories of the remaining processors are initially written with the modified information intended for them before these remaining processors also again assume switching requests with full efficiency.

5. Method according to claim 4, wherein at least a majority of the processors contain their own local memories which store program parts—identical in all of these processors—for the implementation of their switching requests; and wherein in the transition time, the processors previously not contained in the special-purpose computer immediately receive a stimulus to write modified information into the administration memories individually allocated to them on the basis of a program part stored in their respective local memory.

6. Method according to claim 2, wherein every processor has its own redundant administration memory individually allocated to it; wherein the special-purpose computer respectively co-contains one-half of all administration memories of all processors in its memory sections; wherein before the reunification, all administration memory halves contained in the special-purpose computer, but not the other halves of these administration memories are loaded with the modified information intended for them; and wherein in the transition time—in operating pauses of the appertaining memories—, the information that are stored in the first administration memory half and that control the switching operations since the reunification are also automatically written into the second administration memory half before both administration memory halves of each and every processor again operate with full efficiency as in normal operating times.

7. Method according to claim 6, wherein every processor also has its own, redundant local memory allocated to it which is written with switching program parts that are frequently required and that are immediately required in emergency; wherein the special-purpose computer respectively co-contains the one-half of all these local memories of all processors; wherein before the reunification, all halves of these local memories contained in the special-purpose computer, but not the other halves of these local memories are loaded with the modified information intended for them; and wherein in the transition time—in operating pauses of the appertaining halves—the information that are stored in the first half of the local memories and that control the switching operations since the reunification are also automatically copied into the respectively corresponding second half of these local memories before these two halves of the local memories of the processors operate again in parallel with full efficiency as in normal operating times.

8. Method according to claim 1, wherein at least one part of the modified information input into the administration memory modifies the size of the address space defined by physical addresses.

9. Method according to claim 1, wherein at least one part of the modified information corresponds to a facility newly established for subscribers.

10. Method according to claim 9, wherein at least one part of the modified information corresponds to the beginning addresses of sub-programs that control said facility.

11. Method according to claim 1, wherein the line unit of the special-purpose computer contains an external data carrier that carries magnetically recorded, modified information; and wherein the modified information are written from this data carrier into memory sections of the special-purpose computer.

12. Method according to claim 1, wherein the line unit represents a redundant user station represents a redundant user station; and wherein the modified information are input into the special-purpose computer via a split-off half of the user station.

13. Method according to claim 1, wherein—before the split-off of the special-purpose computer or only after the split-off of the special-purpose computer, but still before the reunification—at least one part of the information that are semi-permanently stored in the administration memory of the special-purpose computer and/or in other memory sections of the special-purpose computer is translated by a first language translation unit into a higher language and is output at the line unit of the special-purpose computer for example displayed or printed out or registered on a data; and in that, in the special operating time, the modified information are input via the line unit into the special-purpose computer in the same or in some other higher language and are translated into the machine language in the first or in a second language translation unit and are stored in the respectively appertaining memory sections of the special-purpose computer.

14. Method according to claim 1, wherein in the special operating time, memory sections of the halves of switching system component parts doubled in redundant fashion and peripherally connected to the central control unit and that contain their own, i.e. decentralized memory sections and their own processors are co-contained in the special-purpose computer.

15. Method according to claim 3, wherein every processor has its own redundant administration memory individually allocated to it; wherein the special-purpose computer respectively co-contains one-half of all administration memories of all processors in its memory sections; wherein before the reunification, all administration memory halves contained in the special-purpose computer, but not the other halves of these administration memories are loaded with the modified information intended for them; and wherein in the transition time—in operating pauses of the appertaining memories—the information that are stored in the first administration memory half and that control the switching operations since the reunification are also automatically written into the second administration memory half before both administration memory halves of each and every processor again operate with full efficiency as in normal operating times.

16. Method according to claim 15, wherein every processor also has its own, redundant local memory allocated to it which is written with switching program parts that are frequently required and that are immediately required in emergency; wherein the special-purpose computer respectively co-contains the one-half of all these local memories of all processors; wherein before the reunification, all halves of these local memories contained in the special-purpose computer, but not the other halves of these local memories are loaded with the modified information intended for them; and wherein in the transition time—in operating pauses of the appertaining halves, the information that are stored in the first half of the local memories and that control the switching operations since the reunification are also automatically copied into the respectively corresponding second half of these local memories before these two halves of the local memories of the processors operate again in parallel with full efficiency as in normal operating times.

17. The method according to claim 2, wherein the background memory is a magnetic tape.

18. The method according to claim 3, wherein the processors capable of immediate access in the transition time are initially not yet co-controlled by the earlier memory sections of the remaining central control unit by temporarily deactivating signal outputs of all memory sections that do not yet store modified information, at least during reading from memory sections.

19. The method according to claim 5, wherein the processors previously not contained in the special-purpose computer immediately receive a stimulus from the base processor previously contained in the special-purpose computer.

20. The method according to claim 13, wherein the higher language is at least one of a command language, a higher programming language and a colloquial language.

* * * * *